US009734573B2

(12) United States Patent
Spottiswoode et al.

(10) Patent No.: US 9,734,573 B2
(45) Date of Patent: Aug. 15, 2017

(54) METHODS AND SYSTEMS FOR AUTOMATICALLY DETERMINING MAGNETIC FIELD INVERSION TIME OF A TISSUE SPECIES

(71) Applicants: The United States of America, as respresented by the Secretary, Dept. of Health and Human Services, Washington, DC (US); Siemens Healthcare GmbH, Erlangen (DE)

(72) Inventors: Bruce S. Spottiswoode, Chicago, IL (US); Xiaoguang Lu, West Windsor, NJ (US); Xiaoming Bi, Aurora, IL (US); Hui Xue, Englewood, NJ (US); Christopher Glielmi, Hoboken, NJ (US); Peter Kellman, Bethesda, MD (US); Andreas Greiser, Erlangen (DE)

(73) Assignees: The United States of America, as represented by the Secretary, Dept. of Health and Human Services, Washington, DC (US); Siemens Healthcare GmbH, Erlangen (DE)

( * ) Notice: Subject to any disclaimer, the term of this patent is extended or adjusted under 35 U.S.C. 154(b) by 361 days.

(21) Appl. No.: 14/245,011

(22) Filed: Apr. 4, 2014

(65) Prior Publication Data
US 2014/0314289 A1 Oct. 23, 2014

Related U.S. Application Data

(60) Provisional application No. 61/812,743, filed on Apr. 17, 2013.

(51) Int. Cl.
G06T 7/00 (2017.01)

(52) U.S. Cl.
CPC .. *G06T 7/0012* (2013.01); *G06T 2207/10088* (2013.01); *G06T 2207/30048* (2013.01)

(58) Field of Classification Search
None
See application file for complete search history.

(56) References Cited

U.S. PATENT DOCUMENTS 5,588,431 A * 12/1996 Mani ............... A61B 5/0263
324/307
5,889,524 A * 3/1999 Sheehan ............ G06T 17/20
345/419

(Continued)

OTHER PUBLICATIONS

Zhu, David C., and Richard D. Penn. "Full-brain T1 mapping through inversion recovery fast spin echo imaging with time-efficient slice ordering." Magnetic resonance in medicine 54, No. 3 (2005): 725-731.*

(Continued)

*Primary Examiner* — Sumati Lefkowitz
*Assistant Examiner* — Carol Wang (57) ABSTRACT

A computer-implemented method for determining magnetic field inversion time of a tissue species includes generating a T1-mapping image of a tissue of interest, the T1-mapping image comprising a plurality of T1 values within an expected range of T1 values for the tissue of interest. An image mask is created based on predetermined identification information about the tissue of interest. Next, an updated image mask is created based on a largest connected region in the image mask. The updated image mask is applied to the T1-mapping image to yield a masked image. Then, a mean relaxation time value is determined for the largest connected region. The mean relaxation time value is then used to determine a time point for nulling longitudinal magnetization.

14 Claims, 11 Drawing Sheets

(56) References Cited

U.S. PATENT DOCUMENTS

| | | | |
|---|---|---|---|
| 6,023,495 A * | 2/2000 | Adler | A61B 6/032 378/4 |
| 6,430,430 B1 * | 8/2002 | Gosche | G06T 7/0012 128/920 |
| 7,715,627 B2 | 5/2010 | Sun et al. | |
| 7,877,130 B2 | 1/2011 | O'Donnell et al. | |
| 8,112,145 B2 | 2/2012 | Grist et al. | |
| 8,218,849 B2 | 7/2012 | Lu et al. | |
| 2002/0087067 A1 * | 7/2002 | Foo | G01R 33/5601 600/413 |
| 2003/0042905 A1 * | 3/2003 | Miyazaki | G01R 33/5635 324/314 |
| 2005/0004446 A1 * | 1/2005 | Cowan | G06F 19/321 600/407 |
| 2005/0008208 A1 * | 1/2005 | Cowan | G01R 33/543 382/128 |
| 2007/0036414 A1 * | 2/2007 | Georgescu | G06T 7/0083 382/128 |
| 2008/0004521 A1 | 1/2008 | Hundley et al. | |
| 2009/0027051 A1 * | 1/2009 | Stuber | G01R 33/4828 324/309 |
| 2010/0085051 A1 * | 4/2010 | Littmann | A61B 5/055 324/309 |
| 2010/0195883 A1 * | 8/2010 | Patriarche | G06K 9/3233 382/131 |
| 2011/0181285 A1 * | 7/2011 | Greiser | A61B 5/055 324/309 |
| 2012/0121152 A1 | 5/2012 | Lu et al. | |
| 2012/0195485 A1 * | 8/2012 | Matsuba | A61B 5/0263 382/131 |
| 2013/0265053 A1 * | 10/2013 | Itagaki | G01R 33/543 324/309 |
| 2015/0099964 A1 * | 4/2015 | Voigt | A61B 5/7292 600/420 |

OTHER PUBLICATIONS

Wang, Y., K. C. Wu, K. Kitagawa, V. Murthy, and C. H. Lorenz. "Myocardial T1 Mapping Using Inversion Recovery SSFP Cine." (2007).*

Dabir, Darius, Nicholas Child, Ashwin Kalra, Toby Rogers, Rolf Gebker, Andrew Jabbour, Sven Plein et al. "Reference values for healthy human myocardium using a T1 mapping methodology: results from the International T1 Multicenter cardiovascular magnetic resonance study." Journal of Cardiovascular Magnetic Resonance 16, No. 1 (2014): 1.*

Gupta, et al, "Myocardial Infarction: Optimization of Inversion Times at Delayed Contrast-enhanced MR Imaging", Radiology 2004 233:3, 921-926.

Milanesi, et al, "Modified cine inversion recovery pulse sequence for the quantification of myocardial T1 and gadolinium partition coefficient", J Magn Reson Imaging Jan. 2013;37(1): 109-118.

Higgins, et al, "T1 measurement using a short acquisition period for quantitative cardiac applications", Med Phys. 32(6):1738-1746 (2005).

Messroghli, et al, "Modified Look-Locker Inversion Recovery (MOLLI) for High-Resolution T1 Mapping of the Heart:", Magnetic Resonance in Medicine 52:141-146 (2004).

Piechnik, et al, "Shortened Modified Look-Locker Inversion recovery (ShMOLLI) for clinical myocardial T1 mapping at 1.5 and 3 T within a 9 heartbeat breathhold", Journal of Cardiovascular Magnetic Resonance 2010, 12:69, pp. 1-11.

Song, et al, "Flexible cardiac T1 mapping using a modified Look-Locker acquisition with saturation recovery", Magn Reson Reson Med. Mar. 2012;67(3):622-627.

Lu, et al., "Automatic View Planning for Cardiac MRI Acquisition", Proc. International Conference on Medical Image Computing and Computer Assisted Invervention (MICCAI), Toronto, CA, Sep. 2011, 8 pages.

Lu et al.,"Cardiac Anchoring in MRI Through Context Modeling", Proc. Int'l Conf. on Medical Image Computing and Computer Assisted Intervention (MICCAI), LNCS 6361, pp. 383-390, 2010.

Xue, et al, "Improved Motion Correction Using Image Registration Based on Variational Synthetic Image Estimation: Application to Inline T1 Mapping of Myocardium", Journal of Cardiovascular Magnetic Resonance 2011 3(Suppl 1):P21.

Xue, et al., "Motion Correction for Myocardial T1 Mapping Using Image Registration with Synthetic Image Estimation", Magnetic Resonance in Medicine 67:1644-1655 (2012).

Petitjean, et al, "A Review of Segmentation Methods in Short Axis Cardiac MR Images", Medical Image Analysis, vol. 15, Issue 2, pp. 169-184, Apr. 2011.

Greiser, et al, "Optimization and Standardization of TI-Selection in Contrast Enhanced Viability Imaging by Automated Analysis of Rapid Quantitative T1 Mapping", Proc. Intl. Soc. Mag. Reson. Med. 21 (2013).

Ugander, et al, "Extracellular Volume Imaging by Magnetic Resonance Imaging Provides Insights into Overt and Sub-clinical Myocardial Pathology", European Heart Journal (2012) 33, pp. 1268-1278.

Lee, et al, "Myocardial T1 and Extracellular Volume Fraction Mapping at 3 Tesla", Journal of Cardiovascular Magnetic Resonance 2011, 13:75, 10 pages.

* cited by examiner

| Time post contrast (minutes) | Normal myocardium T1 minimum (ms) | Normal myocardium T1 maximum (ms) |
|---|---|---|
| 3 | 300 | 400 |
| 8 | 380 | 450 |
| 13 | 400 | 500 |
| 18 | 420 | 520 |
| 23 | 540 | 550 |

METHODS AND SYSTEMS FOR AUTOMATICALLY DETERMINING MAGNETIC FIELD INVERSION TIME OF A TISSUE SPECIES

CROSS-REFERENCE TO RELATED APPLICATIONS

This application claims priority to U.S. provisional application Ser. No. 61/812,743 filed Apr. 17, 2013 which is incorporated herein by reference in its entirety.

TECHNICAL FIELD

The present invention relates generally to methods, systems, and apparatuses for automatically determining magnetic inversion time of a tissue species using a T1-mapping image, a-priori information about the region of interest, and a tissue classification algorithm. The disclosed methods, systems, and apparatuses may be applied to, for example, to identify areas of healthy tissue in cardiac applications.

BACKGROUND

Conventional inversion recovery (IR) methods in magnetic resonance imaging (MRI) can be used to suppress a signal from a specific tissue and, as such, leverage the image contrast in adjacent tissues. For example late enhancement IR imaging may be used to diagnose a wide range of ischemic and non-ischemic cardiomyopathies. In this application, a gadolinium-based extracellular contrast agent (e.g., gadolinium-DTPA) which is administered intravenously to shorten the T1 relaxation time of protons in the tissue of interest. The gadolinium remains in infarcted tissue long after it washes out of the surrounding normal myocardium and, by obtaining images multiple minutes after the injection, a high image contrast can be obtained between the healthy myocardium and the fibrosis. This is referred to as late gadolinium enhanced (LGE) imaging. The resulting contrast can be best appreciated using IR imaging to null the signal of the healthy myocardium.

The TI time for optimal myocardial nulling ($TI_{null}$) depends on a number of factors, including IR imaging pulse sequence used, patient age, cardiac function, magnetic field strength, a volume of the contrast bolus, and a time between a contrast injection and a scan. This optimal TI time is typically estimated using a TI scout sequence. This sequence acquires a segmented cine series of images covering a range of time points following an inversion pulse, wherein each segment corresponds to a different TI. An MRI operator visually selects a TI time where the signal intensity in the healthy myocardium is minimal and subsequently runs a higher resolution IR scan using this optimal TI time. An offset in TI is typically added to compensate for the sequence differences between the TI scout and the IR scan. In conventional systems, T1 and the optimal TI are estimated using a segmented cine inversion recovery sequence, but these systems are difficult to automate as they are based on a series of images which differ both in contrast and cardiac phase.

SUMMARY

Embodiments of the present invention address and overcome one or more of the above shortcomings and drawbacks, by providing methods, systems, and apparatuses for automatically determining magnetic field inversion time of a tissue species based on a combination of a T1 parametric map, a-priori knowledge about the whereabouts of the tissue, and a T1-based healthy tissue classification algorithm. This technology is particularly well-suited for, but by no means limited to, cardiac-focused clinical applications.

According to some embodiments of the present invention, a computer-implemented method for determining magnetic field inversion time of a tissue species includes generating a T1-mapping image of a tissue of interest, the T1-mapping image comprising T1 values within an expected range of T1 values for the tissue of interest. For example, in one embodiment, cardiac tissue is the tissue of interest and this range is 300 milliseconds and 500 milliseconds following application of a contrast agent. An image mask is created based on predetermined identification information about the tissue of interest. This predetermined identification information may include, for example, one or more of a-priori position information, prior segmentation, or tissue classification information. Next, an updated image mask is created based on a largest connected region in the image mask. The updated image mask is applied to the T1-mapping image to yield a masked image. A mean relaxation time value is determined for the largest connected region. Then, a time point for nulling longitudinal magnetization is determined based on the mean relaxation time value for the largest connected region. In some embodiments, a pixel erosion process is applied to the largest connected region prior to creating the updated image mask. For example, in one embodiment, the pixel erosion process removes one or more pixels from a boundary of the largest connected region prior to calculating the time point.

Various enhancements, additions, and/or modifications may be made to the aforementioned method. For example, in one embodiment, an inversion time setting for an MR imaging device may be automatically determined based on the time point for nulling longitudinal magnetization. In another embodiment, at least one of an inversion radiofrequency pulse or a saturation radiofrequency pulse is applied to the tissue of interest and T1 recovery is sampled (e.g., over multiple heartbeats) to generate the T1-mapping image.

In some embodiments, a model of an anatomical area comprising the tissue of interest is used to determine the predetermined identification information employed in the method. The model may include, for example, a polygon mesh and one more embedded discriminative features learned offline from annotated cases. Then, additional enhancements may be based on the model. For example, in one embodiment, the model is fit to a stack of single-shot scout images to estimate a first sub-region of the anatomical area. The method discussed above may then be enhanced by also overlaying the model onto the T1-mapping image; spatially aligning the stack of single-shot scout images with the T1-mapping image; applying a re-slicing process to the model to estimate one or more additional sub-regions of the anatomical area; and determining the image mask based on the first sub-region of the anatomical area and the one or more additional sub-regions of the anatomical area. The sub-regions will corresponds to the anatomical area of interest. For example, in one embodiment, the first sub-region of the anatomical area corresponds to a left ventricle region and the one or more additional sub-regions of the anatomical area corresponds to a left ventricular epicardial border and a left ventricular endocardial border.

According to other embodiments of the present invention, an article of manufacture for determining magnetic field inversion time of a tissue species includes a non-transitory, tangible computer-readable medium holding computer-executable instructions for performing the aforementioned method, with or without the enhancements and modifications discussed above.

According to other embodiments of the present invention, a system for identifying healthy tissue in Magnetic Resonance (MR) data includes a repository of T1 relaxation time data values for individual pixels of a region of interest of individual images of a sequence of MR images of a portion of patient anatomy and an image data processor. The image data processor is configured to automatically: identify, within an image of the sequence of MR images, a first area encompassing healthy tissue in the region of interest; employ predetermined information associating a plurality of different ranges of time points for nulling longitudinal magnetization with corresponding types of tissue including a healthy tissue type and noise, to identify at least one individual pixel comprising a second area of healthy tissue within the first area in response to time points for nulling longitudinal magnetization associated with the individual pixels derived using the repository of T1 relaxation time data values; and select a time point for nulling longitudinal magnetization associated with the at least one individual pixel comprising the second area of healthy tissue. In some embodiments, the aforementioned system further includes a modeling processor configured to determine the region of interest by at least one of (a) anatomical segmentation or landmark features derived from a previous MR scan, (b) image-based co-registration, and (c) matching an MR acquisition parameter to that of a localization scout.

In some embodiments, the image data processor included in the aforementioned system is further configured to perform additional functionality. For example, in one embodiment, the image data processor may automatically utilize the time point for nulling longitudinal magnetization in determining inversion time settings for an MR imaging device. In another embodiment, the image data process can adaptively generate a mask for selecting the second area of healthy tissue within the first area using a database of predetermined different healthy tissue T1 values for corresponding different contrast agents as a function of time following injection of a contrast agent. The image data processor may automatically adaptively generate the mask based on criteria such as, for example, time points for nulling longitudinal magnetization associated with the individual pixels having a variation within a predetermined range and/or a size of the second area of healthy tissue.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

The following disclosure describes the present invention according to several embodiments directed at methods, systems, and apparatuses for automatically determining a null inversion time of a tissue species. In some embodiments, a system automatically determines the null inversion time using a T1 parametric map, a-priori anatomical information, and T1-based tissue classification. The system may be used, for example, to improve image contrast in inversion recovery MR imaging and workflow for late enhancement myocardial viability imaging. Additionally, the system may be used to improve inter-scan reliability in MRI myocardial viability imaging by automatically identifying an optimal inversion time to null MR signal in healthy myocardium.

Figure 1:
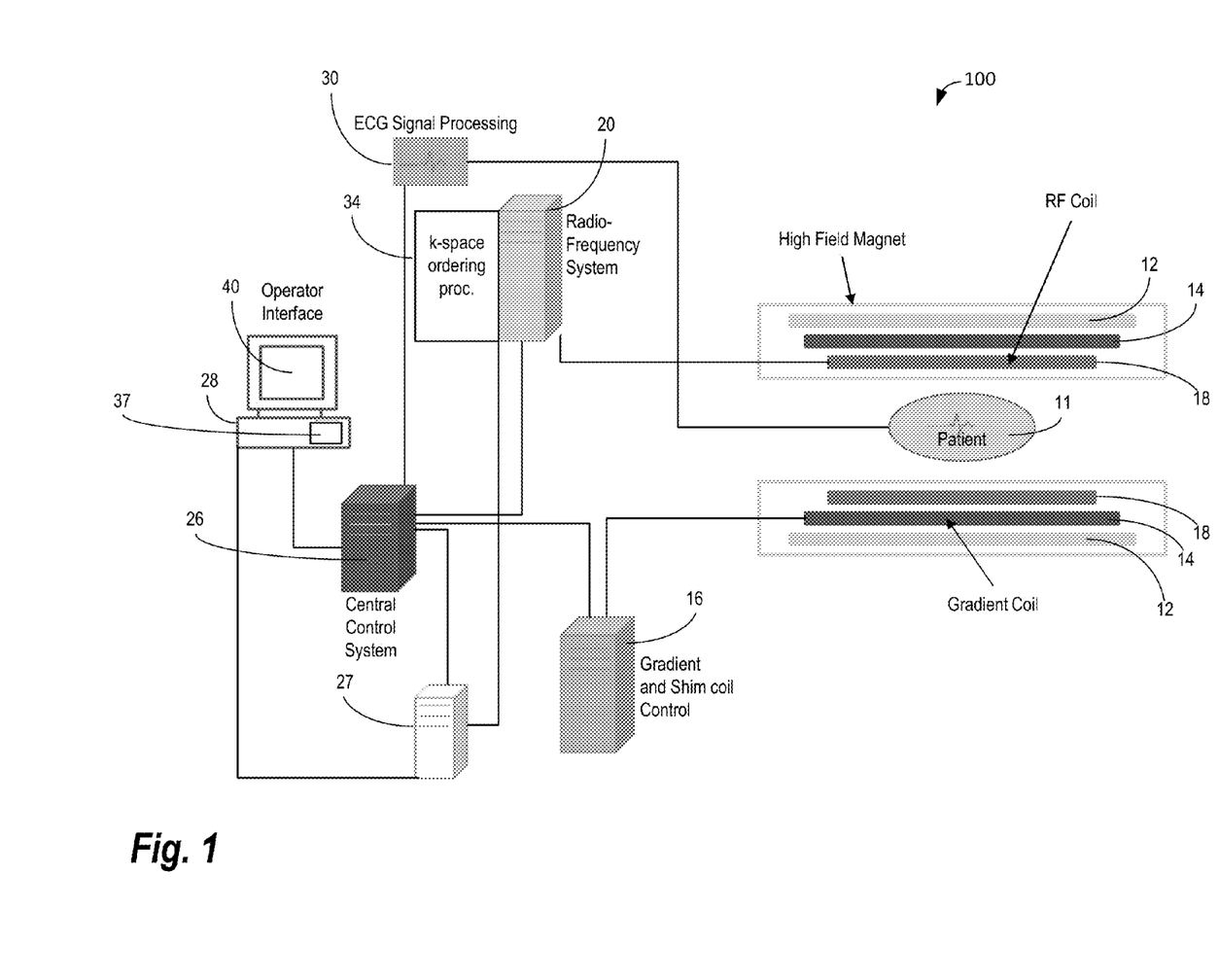
FIG. 1 shows system for ordering acquisition of frequency domain components representing MR image data for storage in a k-space storage array.

FIG. 1 shows system 100 for ordering acquisition of frequency domain components representing MR image data for storage in a k-space storage array. In system 100, magnet 12 creates a static base magnetic field in the body of patient 11 to be imaged and positioned on a table. Within the magnet system are gradient coils 14 for producing position dependent magnetic field gradients superimposed on the static magnetic field. Gradient coils 14, in response to gradient signals supplied thereto by a gradient and shimming and pulse sequence control module 16, produce position dependent and shimmed magnetic field gradients in three orthogonal directions and generates magnetic field pulse sequences. The shimmed gradients compensate for inhomogeneity and variability in an MR imaging device magnetic field resulting from patient anatomical variation and other sources. The magnetic field gradients include a slice-selection gradient magnetic field, a phase-encoding gradient magnetic field and a readout gradient magnetic field that are applied to patient 11.

Further RF (radio frequency) module 20 provides RF pulse signals to RF coil 18, which in response produces magnetic field pulses which rotate the spins of the protons in the imaged body 11 by ninety degrees or by one hundred and eighty degrees for so-called "spin echo" imaging, or by angles less than or equal to 90 degrees for so-called "gradient echo" imaging. Pulse sequence control module 16 in conjunction with RF module 20 as directed by central control unit 26, control slice-selection, phase-encoding, readout gradient magnetic fields, radio frequency transmission, and magnetic resonance signal detection, to acquire magnetic resonance signals representing planar slices of patient 11.

In response to applied RF pulse signals, the RF coil 18 receives MR signals, i.e., signals from the excited protons within the body as they return to an equilibrium position established by the static and gradient magnetic fields. The MR signals are detected and processed by a detector within RF module 20 and k-space component processor unit 34 to provide image representative data to an image data processor. In some embodiments, the image data processor is located in central control unit 26, while in other embodiments such as the one depicted in FIG. 1, the image data processor is located in a separate unit 27. ECG synchronization signal generator 30 provides ECG signals used for pulse sequence and imaging synchronization. A two or three dimensional k-space storage array of individual data elements in unit 34 stores corresponding individual frequency components comprising an MR dataset. The k-space array of individual data elements has a designated center and individual data elements which each have a radius to the designated center.

A magnetic field generator (comprising magnetic coils 12, 14 and 18) generates a magnetic field for use in acquiring multiple individual frequency components corresponding to individual data elements in the storage array. The individual frequency components are successively acquired in an order in which radius of respective corresponding individual data elements increases and decreases along a substantially spiral path as the multiple individual frequency components is sequentially acquired during acquisition of an MR dataset representing an MR image. A storage processor in unit 34 stores individual frequency components acquired using the magnetic field in corresponding individual data elements in the array. The radius of respective corresponding individual data elements alternately increases and decreases as multiple sequential individual frequency components are acquired. The magnetic field acquires individual frequency components in an order corresponding to a sequence of substantially adjacent individual data elements in the array and magnetic field gradient change between successively acquired frequency components is substantially minimized.

Central control unit 26 uses information stored in an internal database to process the detected MR signals in a coordinated manner to generate high quality images of a selected slice (or slices) of the body and adjusts other parameters of system 100. The stored information comprises predetermined pulse sequence and magnetic field gradient and strength data as well as data indicating timing, orientation and spatial volume of gradient magnetic fields to be applied in imaging. Generated images are presented on display 40. Computer 28 includes a graphical user interface (GUI) enabling user interaction with central controller 26 and enables user modification of magnetic resonance imaging signals in substantially real time. Display processor 37 processes the magnetic resonance signals to provide image representative data for display on display 40, for example.

The system described herein employs predetermined information associating a plurality of different ranges of T1 null point relaxation time data values with corresponding types of tissue including a healthy tissue type, to identify at least one individual pixel comprising a second area of healthy tissue within the first area in response to T1 null point relaxation time data values associated with the individual pixels derived using the repository. For example, in one embodiment, healthy tissue is defined according to a five step process. First, an initial region of interest is specified using a-priori position information, prior segmentation or tissue classification such as, for example, cardiac Autoalign or contours from cine images. This initial region of interest may include healthy tissue, diseased tissue, and image noise (e.g. from adjacent air or blood). Second, the whereabouts of healthy tissue within the initial region of interest is extracted using a range of expected T1 values for healthy tissue as a function of time since the contrast injection. Next, the largest connected region is retained. This ensures that spurious noisy pixels within the range of expected T1 values are removed. Then, the remaining region is eroded by one pixel to ensure that the intensities haven't been affected by partial volume effects and that attached spurious noise voxels are eliminated. Finally, the mean T1 within the remaining image is used to estimate $T1_{null}$.

Figure 2:
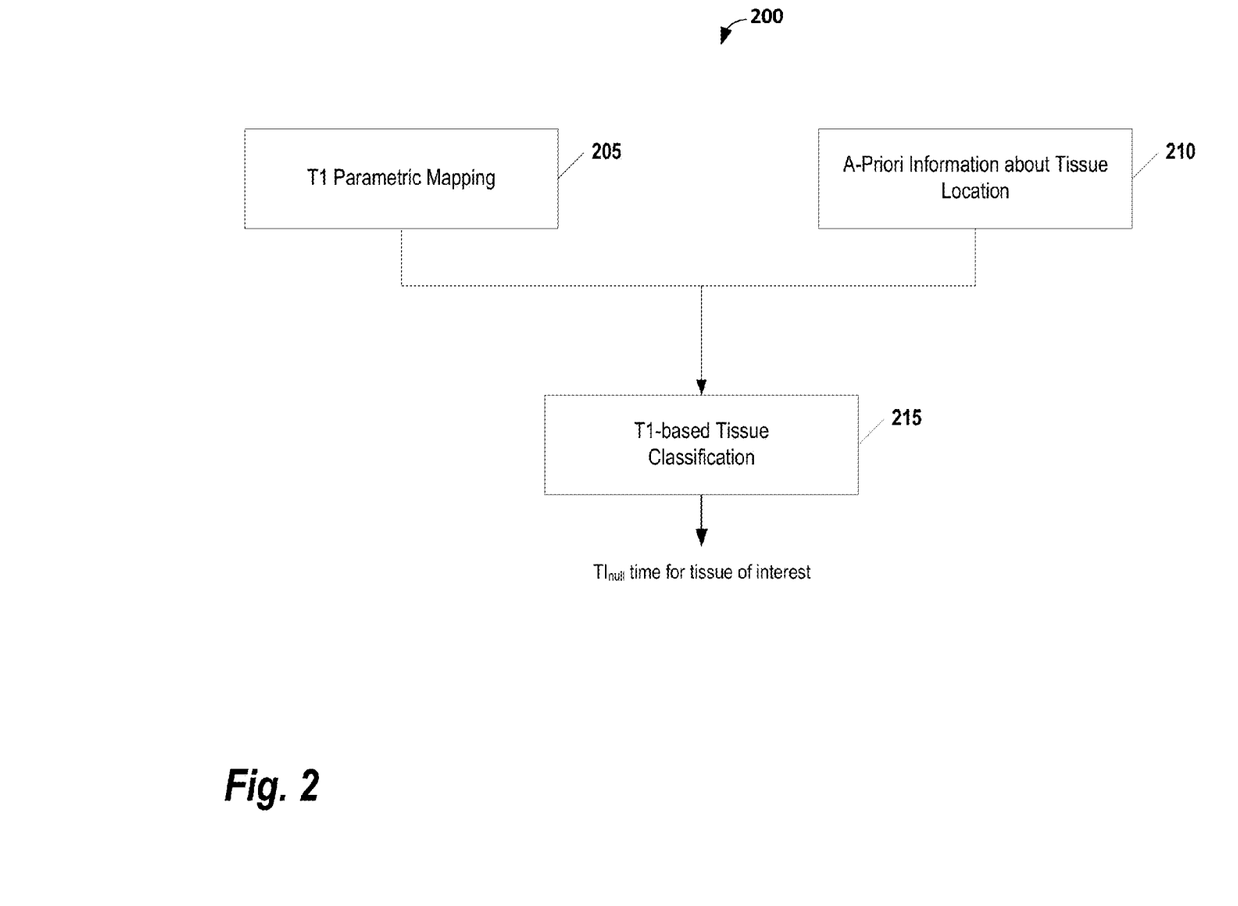
FIG. 2 provides an overview of a system for system for automatically determining magnetic field inversion time of a tissue species, according to some embodiments of the present invention.

FIG. 2 provides an overview of a system 200 for system for automatically determining magnetic field inversion time of a tissue species, according to some embodiments of the present invention. The system 200 provides an automated inversion recovery scout for magnetic resonance that determines $TI_{null}$ using a combination of a T1 parametric map 205, a-priori knowledge about the whereabouts of the tissue 210, and a T1-based healthy tissue classification algorithm 215. The T1-mapping scan run in a clinical setting improves workflow by saving time in running a TI scout and visually inspecting images. Each of the three components 205, 210, and 215 are described in further detail below using the example of applying the system to a cardiac imaging scenario.

The T1 parametric map 205, also referred to herein as the "T1-map", may be created using any technique known in the art. For example, in some embodiments, T1 recovery is sampled over multiple heartbeats after an inversion radiofrequency pulse or a saturation radiofrequency pulse. For inversion recovery, the TI is related to T1 by $M(TI)=M_0(1-2e^{-TI/T1})$, where M corresponds to a recovering longitudinal magnetization, and $M_0$ is a fully relaxed state. Setting $M(TI)=0$ gives the simple relation $TI_{null}=0.69 \times T1$. Therefore, if the T1 of a tissue species is known, the $TI_{null}$ time can be determined.

Figure 3:
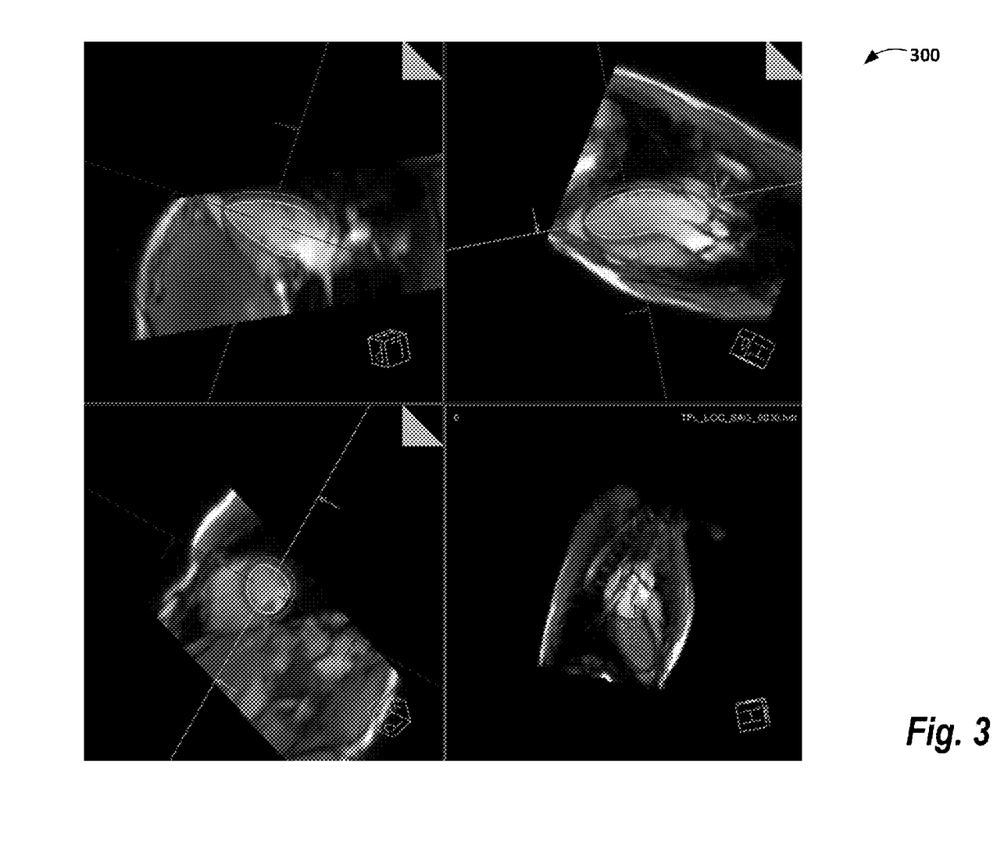
FIG. 3 shows a series of images illustrating how a model of the left ventricle may be automatically fitted to a stack of MRI localizer images.

The a-priori information about the location of a heart 210 may be automatically determined by any of a variety of different model-based methods. For example, FIG. 3 shows a series of images 300 illustrating how a model of a sub-region of the heart (i.e., the left ventricle) may be automatically fitted to a stack of MRI localizer images. In FIG. 3, the whereabouts of an entire left ventricle is determined by fitting a three dimensional model to a stack of single-shot scout images obtained during diastole. The shape of the 3D model is represented by a polygon mesh, and the discriminative features embedded in the model may be learned offline from annotated training cases.

Figure 4:
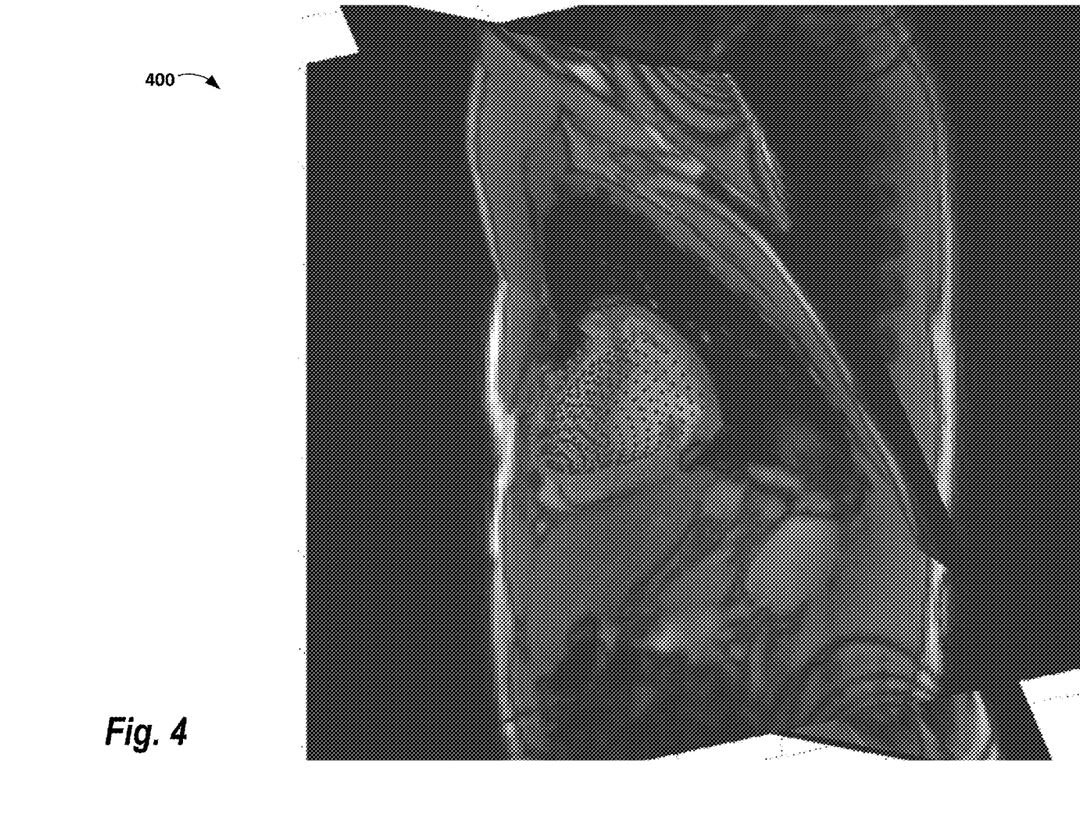
FIG. 4 shows a single slice from the stack of localizer images, the model of the left ventricle, and one of the images used to estimate the T1-map, according to some embodiments of the present invention.

If a T1-map is acquired at the same diastolic phase using a similar temporal footprint, the model can be overlaid onto the T1-map, as shown in FIG. 4. FIG. 4. shows a single slice from the stack of localizer images (plane 1), the model of the left ventricle (vertices portrayed as points), and one of the images used to estimate the T1-map (plane 2), according to some embodiments of the present invention. The localizer images and T1-mapping images in this image were obtained during separate breath holds at the same diastolic phase. The two arrows show misregistration due to slight differences in breath hold position and cardiac phase.

Figure 5:
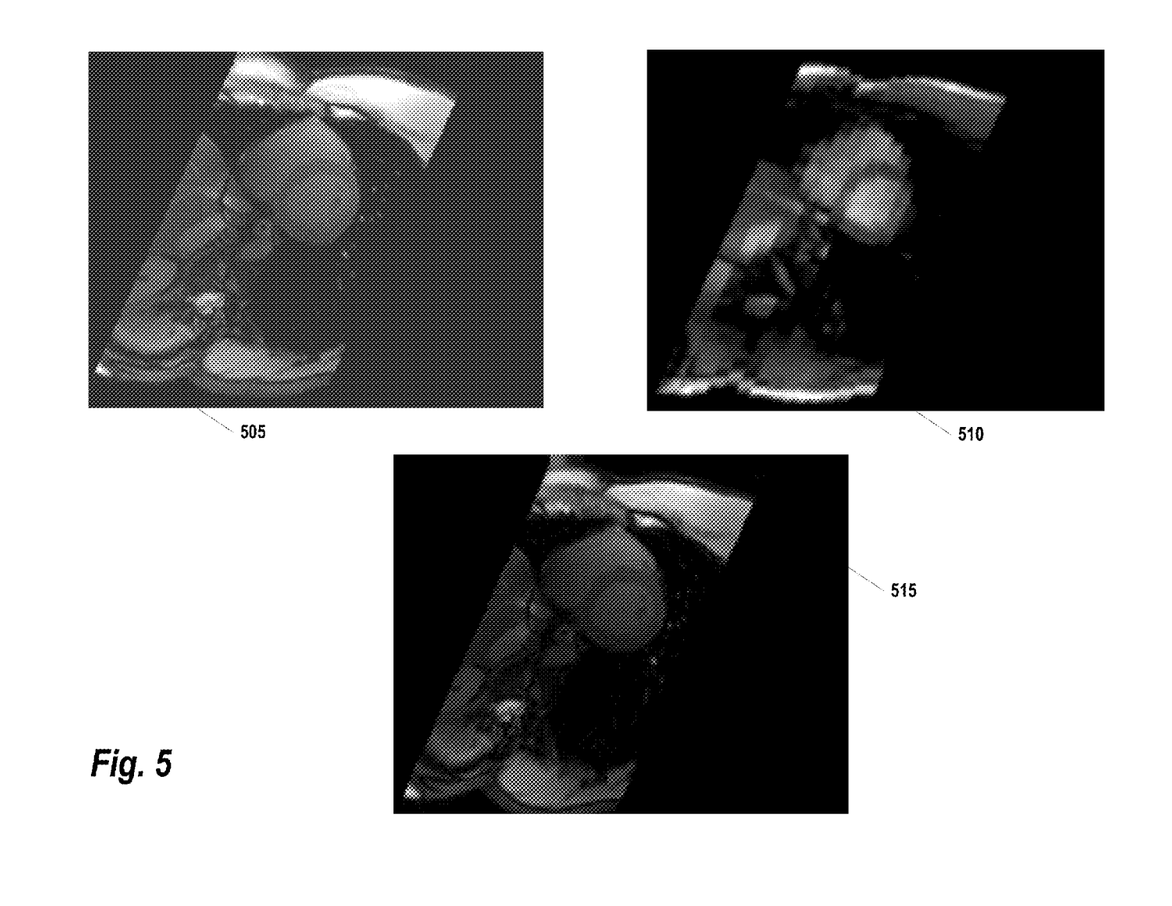
FIG. 5 shows an original image from a T1-mapping Modified Look Locker Imaging (MOLLI) experiment, generated according to some embodiments of the present invention.

In some embodiments, the stack of localizer images can be re-sliced/interpolated to create a new image at the same plane as the T1-mapping image, and two-dimensional non-linear image coregistration can be used to correct for mismatches in the breath hold position and diastolic phase of the two scans. For example, FIG. 5 shows an original image 505 from a T1-mapping Modified Look Locker Imaging (MOLLI) experiment, generated according to some embodiments of the present invention. Image 510 is a localizer image stack re-sliced in the same plane as the T1-mapping image 505. Image 515 corresponds to image 505 after performing non-linear image registration to image 510 thus correcting for mismatches in breath hold position and diastolic phase.

Figure 6:
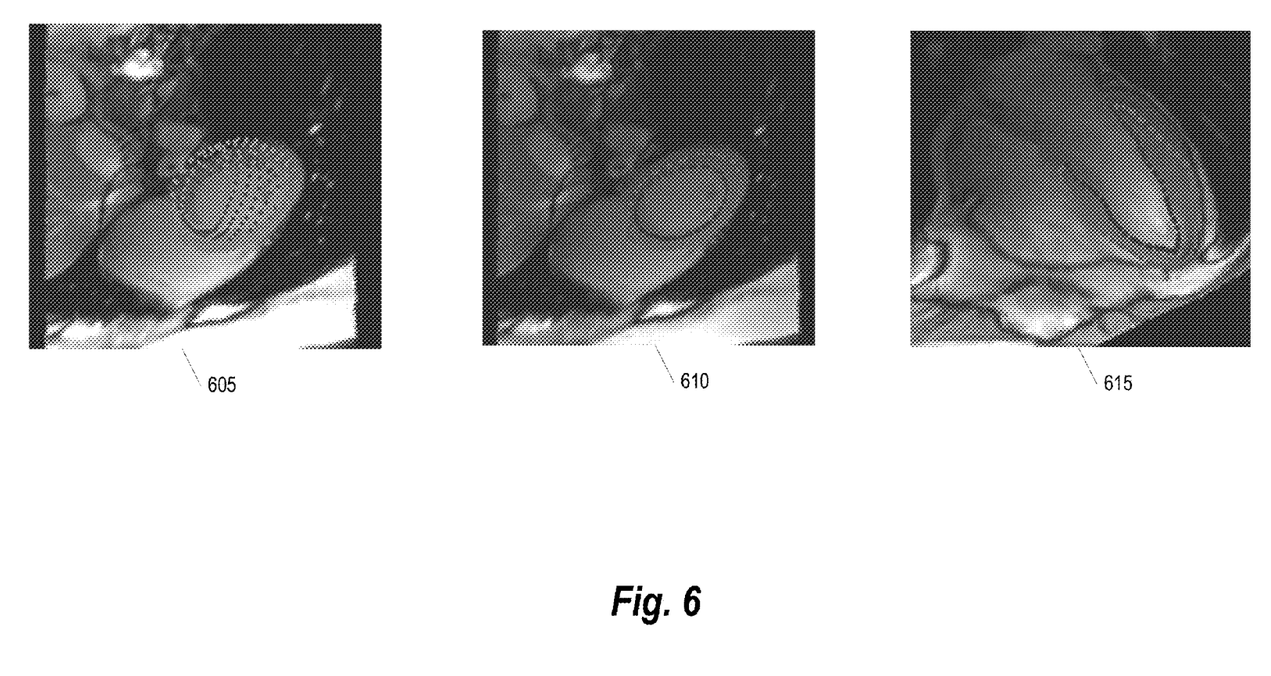
FIG. 6 shows three images which depict the estimating of epicardial and endocardial contours for the T1-map, generated according to some embodiments of the present invention.

Once the T1 image is spatially aligned with the stack of localizer images, a re-slicing process may be applied to the model to estimate a left ventricular epicardial border, a left ventricular endocardial border, and the whereabouts of myocardium using the projection of the fitted mesh polygons. FIG. 6 shows three images 605, 610, 615 which depict the estimating of epicardial and endocardial contours for the T1-map, generated according to some embodiments of the present invention. Image 605 is a model of the left ventricle derived from localizer images and overlaid on co-registered image from a T1-mapping measurement. As shown in image 610, the model can be re-sliced/interpolated to estimate epicardial and endocardial contours for the T1-map, which enclose pixels corresponding to the whereabouts of the myocardium in the left ventricle. Image 615 illustrates example from another subject showing the contours on a T1-mapping image in a 4 chamber view. As seen in 610 and 615, image segmentation provides a good but not perfect delineation of a myocardium. As such, the segmentation may include noise from blood and other adjacent structures. Furthermore, in the presence of non-viable tissue, the range of T1 values within the myocardial boundaries may include both healthy and fibrotic myocardium. It should be noted that FIGS. 3-6 are merely some examples of how the system may be applied. The system is also usable in different, additional cardiac views or imaging planes.

As an alternative to the technique described with reference to FIGS. 3-6, the myocardium may be identified directly from the images used to derive the T1-map by using one of a number of image processing methods known in the art. This alternative presents some benefits and drawbacks compared to the technique of FIGS. 3-6. For example, the direct identification technique may not work for every imaging plane. However, the method does not require a co-registration step. Alternatively, the co-registration step may be avoided using a means of breath hold control or respiratory gating. Another method of automatically locating myocardium involves using contours generated from high resolution cine images or other images acquired separately, which may be propagated to T1-maps if the same slice position and cardiac phase is used.

Figure 7:
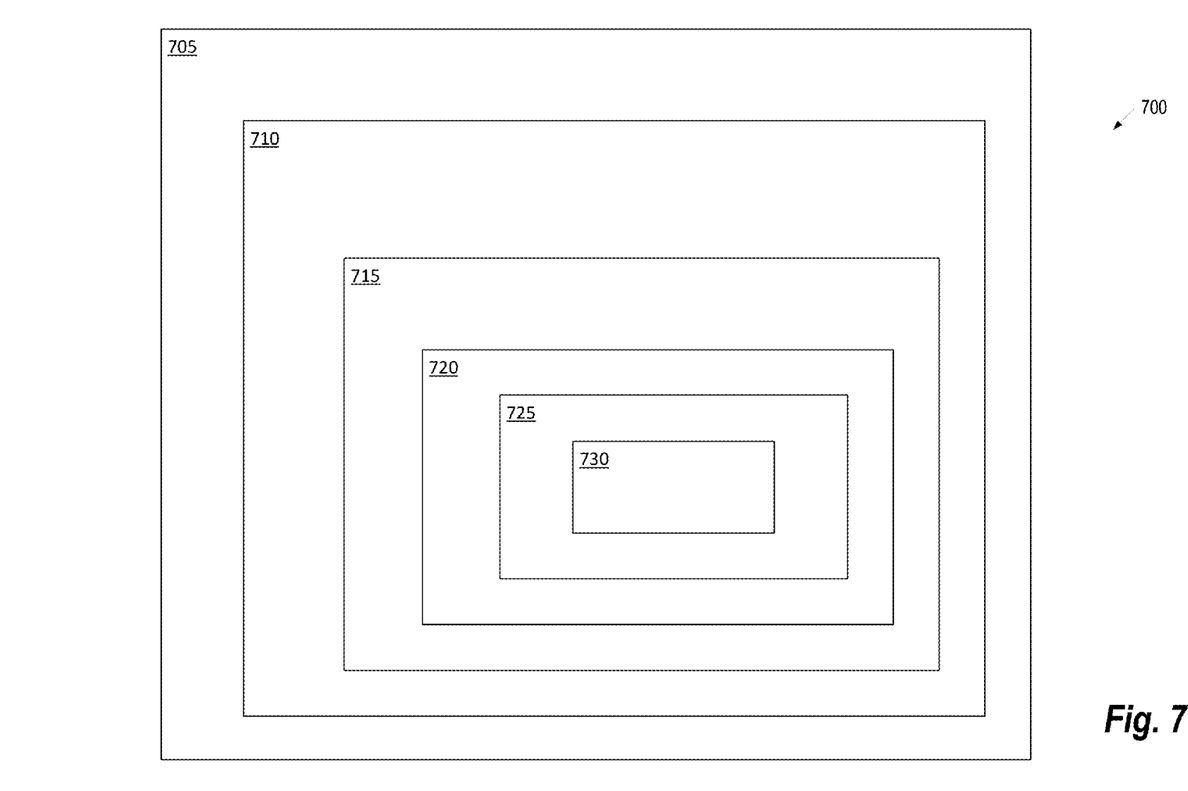
FIG. 7 provides a conceptual overview 700 of how the magnetic field inversion time of a tissue species may be automatically determined, according to some embodiments of the present invention.
Figure 8:
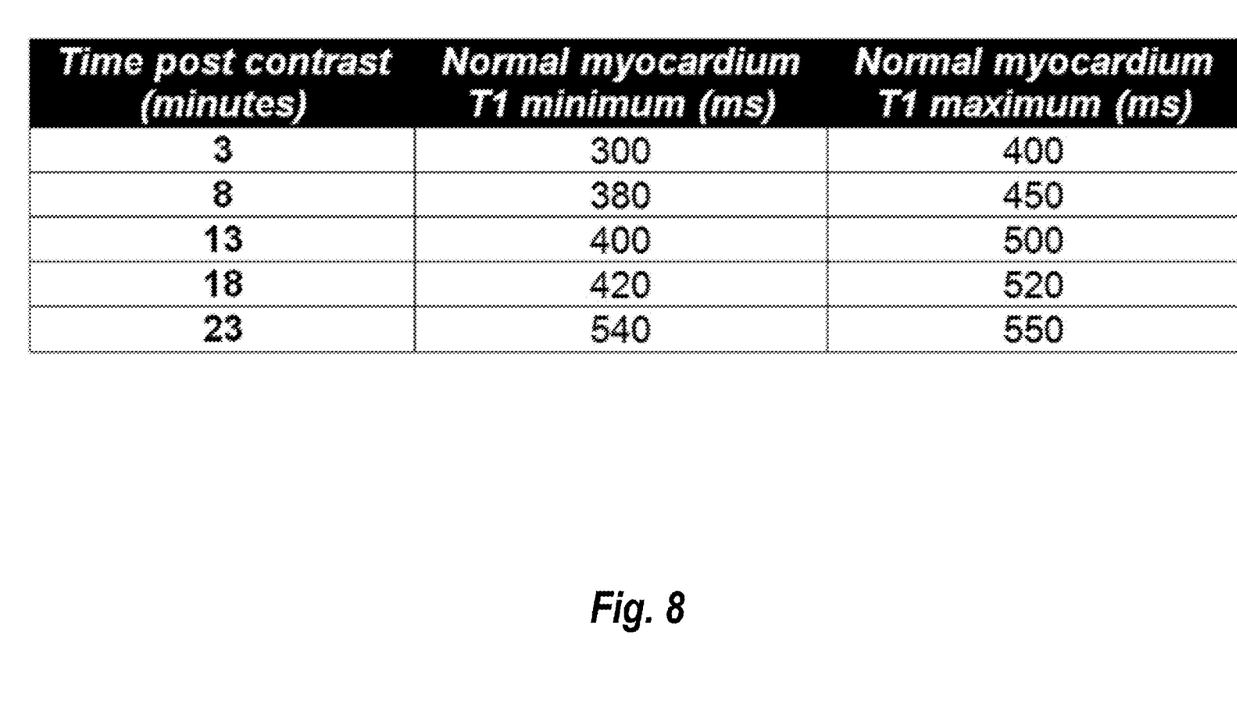
FIG. 8 shows the range of estimated T1 values of normal myocardium at several time points following Gd-DTPA contrast injection, as used in some embodiments of the present invention.

The T1 values in the tissue region determined via the a-priori information about the location of a heart 210 may be used to estimate the $TI_{null}$ for healthy myocardium. In one embodiment, a mask is generated to determine a $TI_{null}$ of healthy myocardium based on a range of expected T1 values for healthy myocardium. FIG. 7 provides a conceptual overview 700 of how the magnetic field inversion time of a tissue species may be automatically determined, according to some embodiments of the present invention. The process begins with an original image 705 that is a T1-map of the area of interest. For applications where contrast is used, image 705 may represent a post-contrast image of the area of interest. Next, image 710 shows a region of 705 that falls within the expected range of T1 values for the tissue of interest. The expected range of values may vary according to time since the contrast injection was administered. For example, FIG. 8 shows the range of estimated T1 values of normal myocardium at several time points Gd-DTPA contrast injection, as used in some embodiments of the present invention. Abnormal myocardium has shorter T1 values than the T1 minimum.

Returning to the overview 700 of FIG. 7, 715 shows further refinement based on a-priori information about structure/anatomy of interest. Next, region 710 is masked by region 715 to result in region 720. Then, the largest connected region in 720 is retained to remove the majority of spurious noise pixels with T1 values in the expected range. This results in region 725. Any technique known in the art may be used to identify the connected region. For example, in one embodiment, a conventional graph-based algorithm is used. A graph of the masked region is generated with the vertices containing information required by the comparison heuristic (e.g., pixel intensity), while the edges indicate connected neighbors. Following application of the mask, region 725 may optionally be eroded to remove remaining noise pixels on the border of the tissue of interest and yield region 730.

Figure 9:
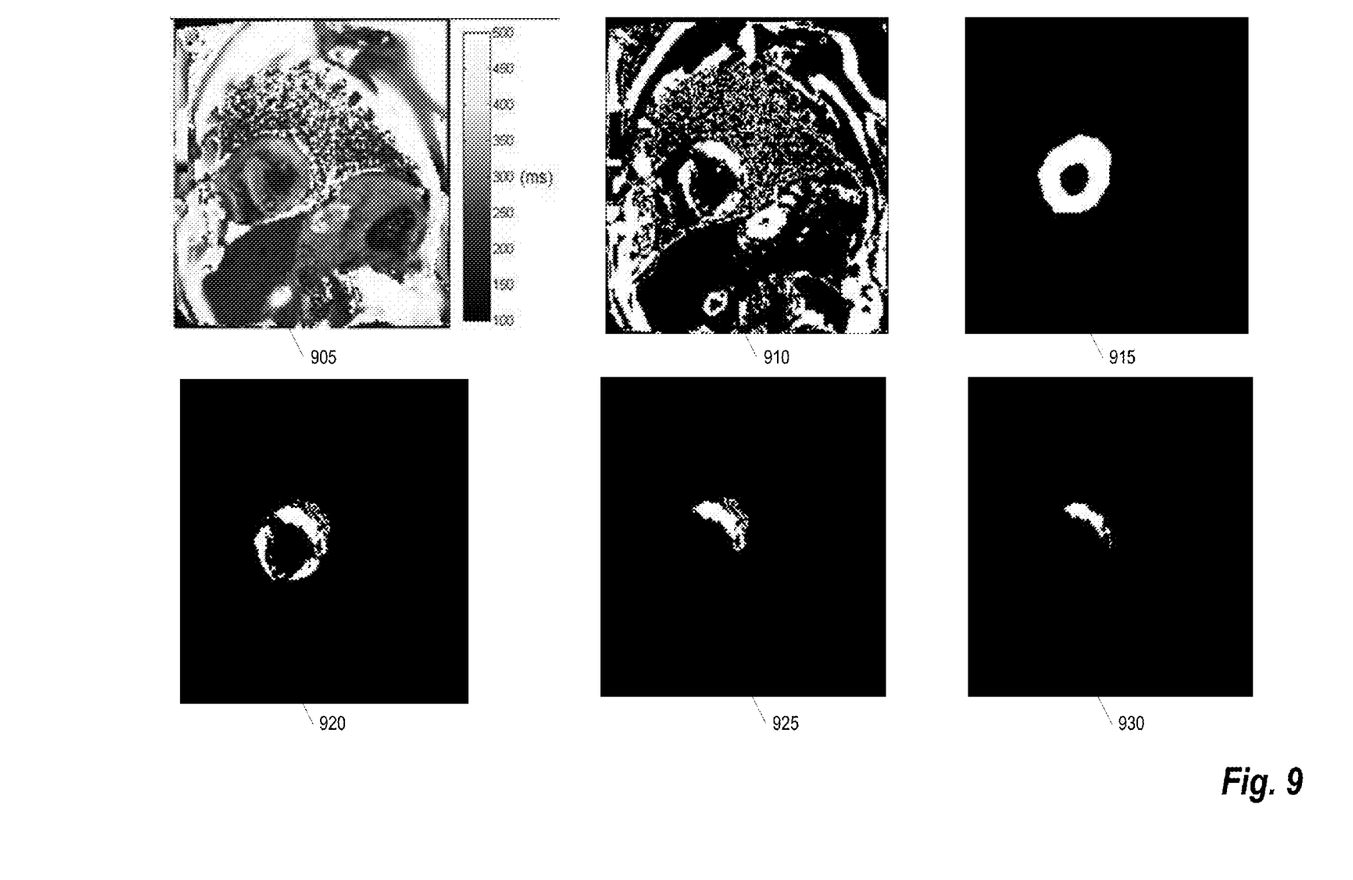
FIG. 9 provides an example of how a visualization may be applied to detect myocardium in cardiac images, according to some embodiments of the present invention.

FIG. 9 provides an example of how the visualization 700 shown in FIG. 7 may be applied to detect myocardium in cardiac images, according to some embodiments of the present invention. Image 905 shows a post contrast T1-map in a cardiac short axis view. First, the region of image 905 that falls within an expected range of T1 values for the tissue of interest are identified to yield the updated image 910. In the example shown in FIG. 9, these T1 images are between 300 milliseconds and 500 milliseconds. Next, a-priori information about structure and anatomy in the area of interest are used to create a mask, as shown in image 915. In the example shown in image 915, a mask of myocardium is shown. However, it should be understood that different masks may be identified depending on the anatomical area of interest. The mask shown in image 915 is applied to image 910 to yield image 920. The pixels used for the determined T1 are refined by retaining a largest connected region of tissue in the mask, thereby further removing noise introduced by imperfect model fitting and image co-registration. This largest connected region is depicted in image 925. Finally, image 925 is eroded to remove any remaining noise pixels on the border of the tissue of interest. Image 930 presents the final representation of healthy myocardium after the erosion process is completed. The $TI_{null}$ may then be determined using a mean T1 in the largest connected region of tissue in the mask, and the relation $TI_{null} = 0.69 \times T1$.

As with a cine TI scout, an offset in TI may be added to compensate for sequence differences between the T1-mapping and subsequent morphological IR viability imaging. Compared to a TI scout method, the T1-mapping gives results that are less biased, as the acquisition in the T1-mapping protocol is closer to what is happening in the LGE imaging protocol, i.e. no continuous readout. In one embodiment, a T1-map and LGE protocol are made similar, i.e. having a same number of readouts, same sequence type, same flip angle, for example, so that a correction for TI may not be necessary.

Returning to FIG. 1, the system 100 may be adapted to perform variations on the techniques discussed above. For example, in one embodiment, the system 100 includes a repository (not shown in FIG. 1) storing T1 relaxation time data values for individual pixels of a region of interest of individual images of a sequence of MR images of a portion of patient anatomy. An image data processor in central control unit 26 is configured to utilize the repository to identify a time point for nulling longitudinal magnetization. Optionally, the system 100 may also include a modeling processor (not shown in FIG. 1) configured to determine the region of interest based on information such as, for example, anatomical segmentation or landmark features derived from a previous MR scan image-based co-registration, and/or matching an MR acquisition parameter to that of a localization scout.

In some embodiments, the image data processor in central control unit 26 is configured to identify a time point for nulling longitudinal magnetization according to a four step process. Initially, a first area encompassing healthy tissue in the region of interest is identified within one of the images included in the sequence of MR images. Next, time points for nulling longitudinal magnetization associated with the individual pixels are derived using the repository. Based on the derived values, at least one individual pixel comprising a second area of healthy tissue within the first area is identified. In some embodiments, this identification is also based on predetermined information associating different ranges of time points for nulling longitudinal magnetization with corresponding types of tissue (e.g., a healthy tissue type and noise). Then, a time point for nulling longitudinal magnetization associated with at least one individual pixel comprising the second area of healthy tissue is selected. In some embodiments, the time point for nulling longitudinal magnetization is then utilized in determining inversion time settings for an MR imaging device.

In some embodiments, the image data processor in central control unit 26 is further configured to generate a mask for selecting the second area of healthy tissue within the first area using a database of predetermined different healthy tissue T1 values for corresponding different contrast agents as a function of time following injection of a contrast agent. This database may be operated in conjunction with, or separate from, the repository. The image data processor may generate the mask, for example, based on time points for nulling longitudinal magnetization associated with the individual pixels having a variation within predetermined range and/or based on the size of the second area of healthy tissue.

Figure 10:
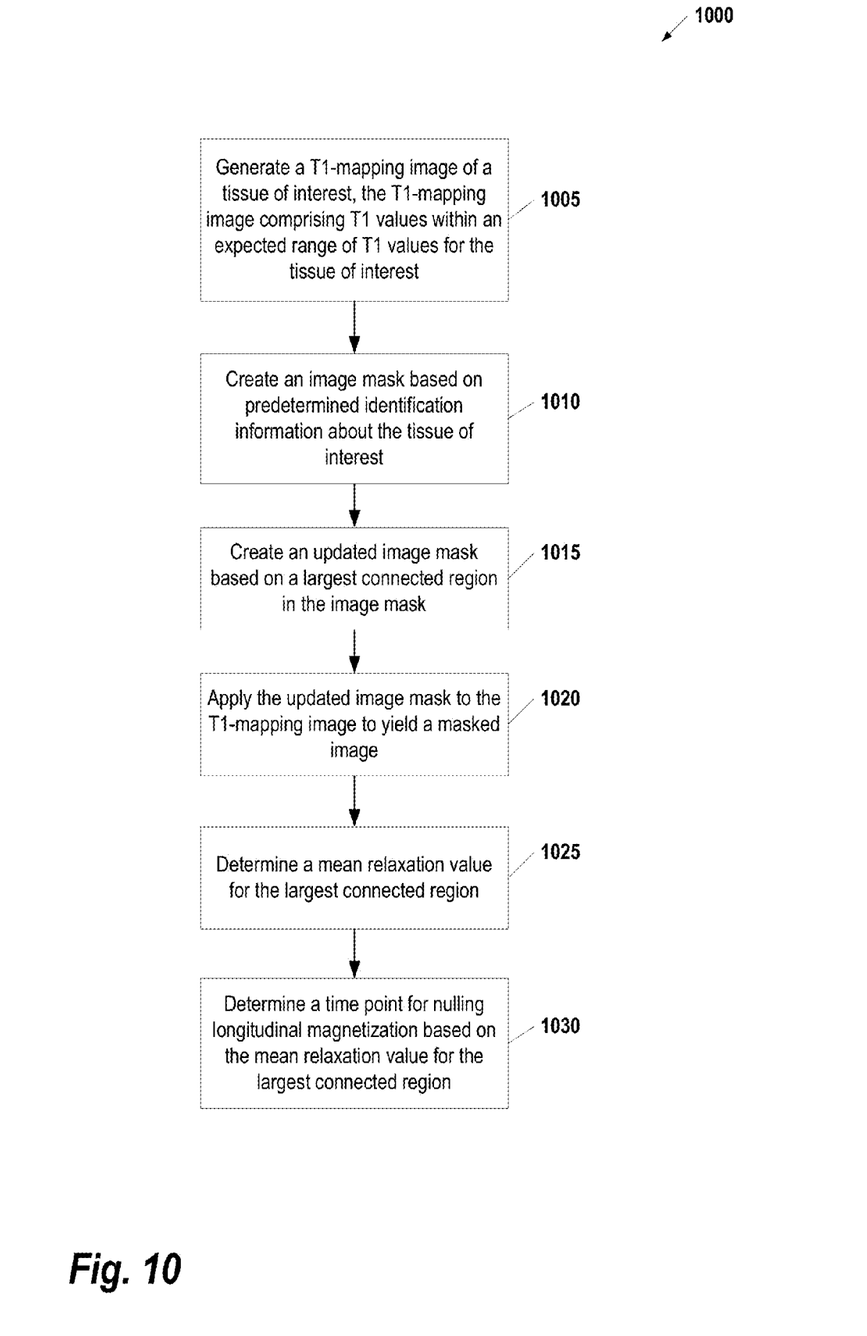
FIG. 10 provides an overview of a process for identifying healthy tissue in MR image data, according to some embodiments of the present invention.

FIG. 10 provides an overview of an additional process 1000 for identifying healthy tissue in MR image data, according to some embodiments of the present invention. The steps of this process 1000 may be performed by one or more processors illustrated in system 100 of FIG. 1. For example, in one embodiment, an image data processor is utilized to perform the process 1000. At 1005, a T1-mapping image of a tissue of interest is generated. This T1-mapping image includes T1 values within an expected range of T1 values for the tissue of interest. Next, at 1010, an image mask is created based on predetermined identification information about the tissue of interest. Then, at 1015, a largest connected region in the masked image is identified and used to create an updated image mask. Optionally, applying a pixel erosion process (not shown in FIG. 10) may be applied to the largest connected region prior to (or while) creating the updated mask. For example, in one embodiment, the pixel erosion process removes one or more pixels from a boundary of the largest connected region. At 1020, the updated image mask is applied to the T1-mapping image to yield a masked image. At 1025, the mean relaxation time value for the largest connected region is calculated. Finally, at 1030, a time point for nulling longitudinal magnetization is determined based on the mean relaxation time value. Once this time point is determined, it may be used as reference or to perform additional operations. For example, in one embodiment, an inversion time setting for an MR imaging device (see, e.g., FIG. 1) is automatically determined based on the time point.

Figure 11:
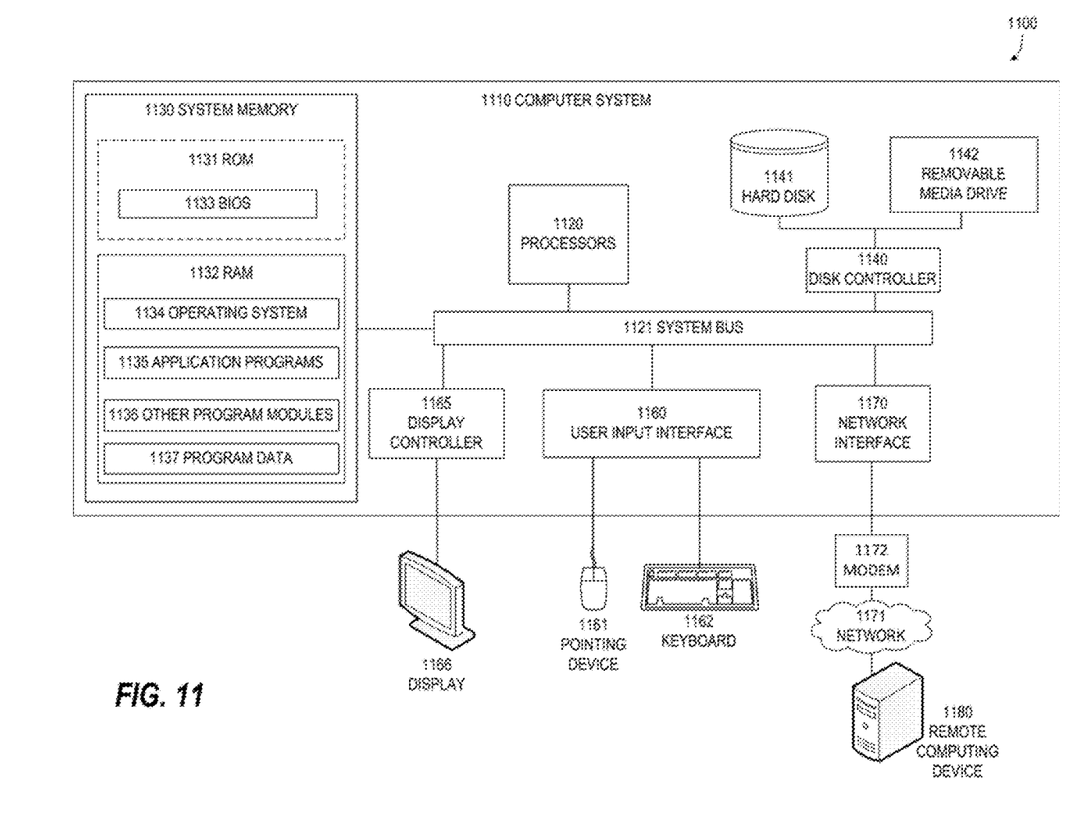
FIG. 11 illustrates an exemplary computing environment within which embodiments of the invention may be implemented.

FIG. 11 illustrates an exemplary computing environment 1100 within which embodiments of the invention may be implemented. For example, computing environment 1100 may be used to implement one or more components of system 100 shown in FIG. 1. Computers and computing environments, such as computer 1110 and computing environment 1100, are known to those of skill in the art and thus are described briefly here.

As shown in FIG. 11, the computer system 1110 may include a communication mechanism such as a bus 1121 or other communication mechanism for communicating information within the computer system 1110. The computer system 1110 further includes one or more processors 1120 coupled with the bus 1121 for processing the information.

The processors 1120 may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

Continuing with reference to FIG. 11, the computer system 1110 also includes a system memory 1130 coupled to the bus 1121 for storing information and instructions to be executed by processors 1120. The system memory 1130 may include computer readable storage media in the form of volatile and/or nonvolatile memory, such as read only memory (ROM) 1131 and/or random access memory (RAM) 1132. The system memory RAM 1132 may include other dynamic storage device(s) (e.g., dynamic RAM, static RAM, and synchronous DRAM). The system memory ROM 1131 may include other static storage device(s) (e.g., programmable ROM, erasable PROM, and electrically erasable PROM). In addition, the system memory 1130 may be used for storing temporary variables or other intermediate information during the execution of instructions by the processors 1120. A basic input/output system 1133 (BIOS) containing the basic routines that help to transfer information between elements within computer system 1110, such as during start-up, may be stored in ROM 1131. RAM 1132 may contain data and/or program modules that are immediately accessible to and/or presently being operated on by the processors 1120. System memory 1130 may additionally include, for example, operating system 1134, application programs 1135, other program modules 1136 and program data 1137.

The computer system 1110 also includes a disk controller 1140 coupled to the bus 1121 to control one or more storage devices for storing information and instructions, such as a magnetic hard disk 1141 and a removable media drive 1142 (e.g., floppy disk drive, compact disc drive, tape drive, and/or solid state drive). The storage devices may be added to the computer system 1110 using an appropriate device interface (e.g., a small computer system interface (SCSI), integrated device electronics (IDE), Universal Serial Bus (USB), or FireWire).

The computer system 1110 may also include a display controller 1165 coupled to the bus 1121 to control a display or monitor 1165, such as a cathode ray tube (CRT) or liquid crystal display (LCD), for displaying information to a computer user. The computer system includes an input interface 1160 and one or more input devices, such as a keyboard 1162 and a pointing device 1161, for interacting with a computer user and providing information to the processor 1120. The pointing device 1161, for example, may be a mouse, a light pen, a trackball, or a pointing stick for communicating direction information and command selections to the processor 1120 and for controlling cursor movement on the display 1166. The display 1166 may provide a touch screen interface which allows input to supplement or replace the communication of direction information and command selections by the pointing device 1161.

The computer system 1110 may perform a portion or all of the processing steps of embodiments of the invention in response to the processors 1120 executing one or more sequences of one or more instructions contained in a memory, such as the system memory 1130. Such instructions may be read into the system memory 1130 from another computer readable medium, such as a hard disk 1141 or a removable media drive 1142. The hard disk 1141 may contain one or more datastores and data files used by embodiments of the present invention. Datastore contents and data files may be encrypted to improve security. The processors 1120 may also be employed in a multi-processing arrangement to execute the one or more sequences of instructions contained in system memory 1130. In alternative embodiments, hard-wired circuitry may be used in place of or in combination with software instructions. Thus, embodiments are not limited to any specific combination of hardware circuitry and software.

As stated above, the computer system 1110 may include at least one computer readable medium or memory for holding instructions programmed according to embodiments of the invention and for containing data structures, tables, records, or other data described herein. The term "computer readable medium" as used herein refers to any medium that participates in providing instructions to the processor 1120 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as hard disk 1141 or removable media drive 1142. Non-limiting examples of volatile media include dynamic memory, such as system memory 1130. Non-limiting examples of transmission media include coaxial cables, copper wire, and fiber optics, including the wires that make up the bus 1121. Transmission media may also take the form of acoustic or light waves, such as those generated during radio wave and infrared data communications.

The computing environment 1100 may further include the computer system 1110 operating in a networked environment using logical connections to one or more remote computers, such as remote computer 1180. Remote computer 1180 may be a personal computer (laptop or desktop), a mobile device, a server, a router, a network PC, a peer device or other common network node, and typically includes many or all of the elements described above relative to computer 1110. When used in a networking environment, computer 1110 may include modem 1172 for establishing communications over a network 1171, such as the Internet. Modem 1172 may be connected to system bus 1121 via user network interface 1170, or via another appropriate mechanism.

Network 1171 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 1110 and other computers (e.g., remote computing system 1180). The network 1171 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 1171.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

We claim:

1. A computer-implemented method for determining magnetic field inversion time of a tissue species, the method comprising:
    generating a T1-mapping image of a tissue of interest, the T1-mapping image comprising a plurality of T1 values within an expected range of T1 values for the tissue of interest;
    creating an image mask based on predetermined identification information about the tissue of interest;
    applying the image mask to the T1-mapping image to yield a masked image;
    identifying a largest connected region of the masked image;
    determining a mean relaxation time value for the largest connected region; and
    determining a time point for nulling longitudinal magnetization of healthy portions of the tissue of interest based on the mean relaxation time value for the largest connected region.

2. The method of claim 1, further comprising:
    applying a pixel erosion process to the largest connected region prior to determining the mean relaxation time value for the largest connected region.

3. The method of claim 2, wherein the pixel erosion process removes one or more pixels from a boundary of the largest connected region.

4. The method of claim 1, further comprising:
    automatically determining an inversion time setting for an MR imaging device based on the time point for nulling longitudinal magnetization.

5. The method of claim 1, further comprising:
    applying at least one of an inversion radiofrequency pulse or a saturation radiofrequency pulse to the tissue of interest; and
    sampling T1 recovery to generate the T1-mapping image.

6. The method of claim 1, wherein the predetermined identification information comprises one or more of a-priori position information, prior segmentation, or tissue classification information.

7. The method of claim 1, wherein a model of an anatomical area comprising the tissue of interest is used to determine the predetermined identification information.

8. The method of claim 7, further comprising:
    fitting the model to a stack of single-shot scout images to estimate a first sub-region of the anatomical area.

9. The method of claim 8, further comprising:
    creating a combined T1-mapping image by overlaying the model onto the T1-mapping image;
    spatially aligning the combined T1-mapping image with the stack of single-shot scout images;
    applying a re-slicing process to the model from the combined T1-mapping image to estimate one or more additional sub-regions of the anatomical area; and
    creating the image mask based on the first sub-region of the anatomical area and the one or more additional sub-regions of the anatomical area.

10. The method of claim 9, wherein the first sub-region of the anatomical area corresponds to a left ventricle region and the one or more additional sub-regions of the anatomical area correspond to a left ventricular epicardial border and a left ventricular endocardial border.

11. The method of claim 7, wherein the model comprises a polygon mesh and one more embedded discriminative features learned offline from annotated cases.

12. The method of claim 1, wherein the expected range of T1 values comprise values between 300 milliseconds and 500 milliseconds following application of a contrast agent.

13. An article of manufacture for determining magnetic field inversion time of a tissue species, the article of manufacture comprising a non-transitory, tangible computer-readable medium holding computer-executable instructions for performing a method comprising:
    generating a T1-mapping image of a tissue of interest, the T1-mapping image comprising a plurality of T1 values within an expected range of T1 values for the tissue of interest;
    creating an image mask based on predetermined identification information about the tissue of interest;
    applying the image mask to the T1-mapping image to yield a masked image;
    identifying a largest connected region of the masked image;
    determining a mean relaxation time value for the largest connected region; and
    determining a time point for nulling longitudinal magnetization of healthy portions of the tissue of interest based on the mean relaxation time value for the largest connected region.

14. The article of manufacture of claim 13, wherein the method further comprises: applying a pixel erosion process to the largest connected region prior to determining the mean relaxation time value for the largest connected region.

* * * * *